United States Patent
Chen (10) Patent No.: US 8,668,222 B2
(45) Date of Patent: Mar. 11, 2014

(54) FOLDABLE STROLLER

(75) Inventor: Rui-Bin Chen, Taipei (TW)

(73) Assignee: Wonderland Nursery Goods Company Limited, Central (HK)

( * ) Notice: Subject to any disclaimer, the term of this patent is extended or adjusted under 35 U.S.C. 154(b) by 45 days.

(21) Appl. No.: 13/563,229

(22) Filed: Jul. 31, 2012

(65) Prior Publication Data

US 2013/0147161 A1    Jun. 13, 2013

(30) Foreign Application Priority Data

Dec. 12, 2011 (CN) ...................... 2011 2 0515912 U (51) Int. Cl.
*B62B 7/06* (2006.01)

(52) U.S. Cl.
USPC .......................... 280/642; 280/647; 280/47.38

(58) Field of Classification Search
USPC ......... 280/639, 642, 643, 647, 648, 650, 657, 280/658, 47.34, 47.38, 47.4, 47.41
See application file for complete search history.

(56) References Cited

U.S. PATENT DOCUMENTS

| 6,581,957 | B1 * | 6/2003 | Lan | 280/642 |
| 6,824,162 | B2 * | 11/2004 | Yeh | 280/642 |
| 7,717,457 | B2 * | 5/2010 | Bearup et al. | 280/647 |
| 8,366,127 | B2 * | 2/2013 | Zhong et al. | 280/47.4 |
| 8,485,547 | B2 * | 7/2013 | Hsu | 280/647 |

* cited by examiner

*Primary Examiner* — John Walters
(74) *Attorney, Agent, or Firm* — Pearl Cohen Zedek Latzer Baratz LLP (57) ABSTRACT

A foldable stroller includes two front legs, two rear legs, a basket frame, two seat-supporting tubes, two pivoting members, two connecting rods, and a backrest-supporting tube. Rotation of the basket frame and the seat-supporting tubes relative to each other about a pivot point results in rotation of the pivoting members relative to the connecting rods about another pivot point to thereby rotate the backrest-supporting tube and the basket frame toward the rear legs in different directions.

8 Claims, 8 Drawing Sheets

FOLDABLE STROLLER

CROSS-REFERENCE TO RELATED APPLICATION

This application claims priority of Chinese Application No. 201120515912.4, filed on Dec. 12, 2011.

BACKGROUND OF THE INVENTION

1. Field of the Invention

This invention relates to a foldable stroller, and more particularly to a foldable stroller having a backrest frame that is folded automatically when folding the stroller.

2. Description of the Related Art

A conventional foldable stroller includes a backrest frame that can be folded automatically when folding the stroller. However, the backrest frame is connected to the remaining portion of the conventional foldable stroller by a relatively complicated structure. Hence, it is desirable that a foldable stroller has a simple structure for connecting a backrest frame to the remaining portion of the foldable stroller.

SUMMARY OF THE INVENTION

The object of this invention is to provide a foldable stroller that includes a backrest frame, which is connected to the remaining portion of the foldable stroller by a simple structure.

According to this invention, a foldable stroller includes two front legs, two rear legs forming an angle with the front legs, respectively, two seat-supporting tubes connected respectively and pivotally to the front legs, a basket frame connected pivotally between the rear legs, and a backrest frame. Each of the front legs includes a front wheel disposed on a lower end thereof. Each of the rear legs includes a rear wheel disposed on a lower end thereof.

Each of the seat-supporting tubes has a rear end is connected pivotally to a front end of the basket frame at a first pivot point. The backrest frame includes two pivoting members disposed respectively at two opposite sides of a bottom end thereof, and a backrest-supporting tube connected to the pivoting members. Each of the pivoting members having a top end connected pivotally to the basket frame at a second pivot point. The foldable stroller further includes two connecting rods. Each of the connecting rods has a rear end connected pivotally to a front end of a respective one of the pivoting members at a third pivot point, and a front end connected pivotally to a respective one of the seat-supporting tubes at a fourth pivot point. Rotation of the basket frame and the seat-supporting tubes relative to each other about the first pivot point results in rotation of the pivoting members relative to the connecting rods about the third pivot point to thereby rotate the backrest-supporting tube and the basket frame toward the rear legs in different directions.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
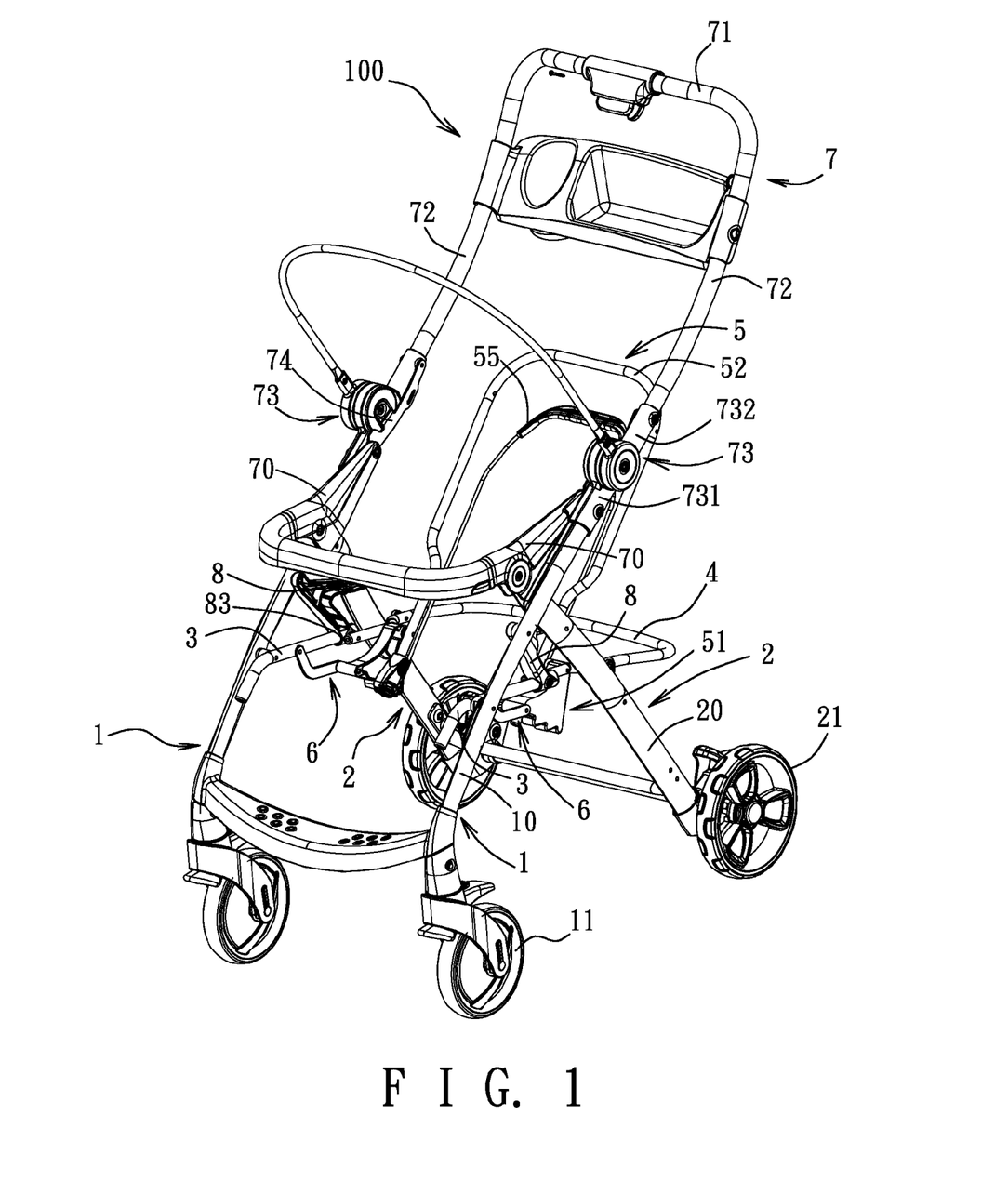
FIG. 1 is a front perspective view of the preferred embodiment of a foldable stroller according to this invention.
Figure 2:
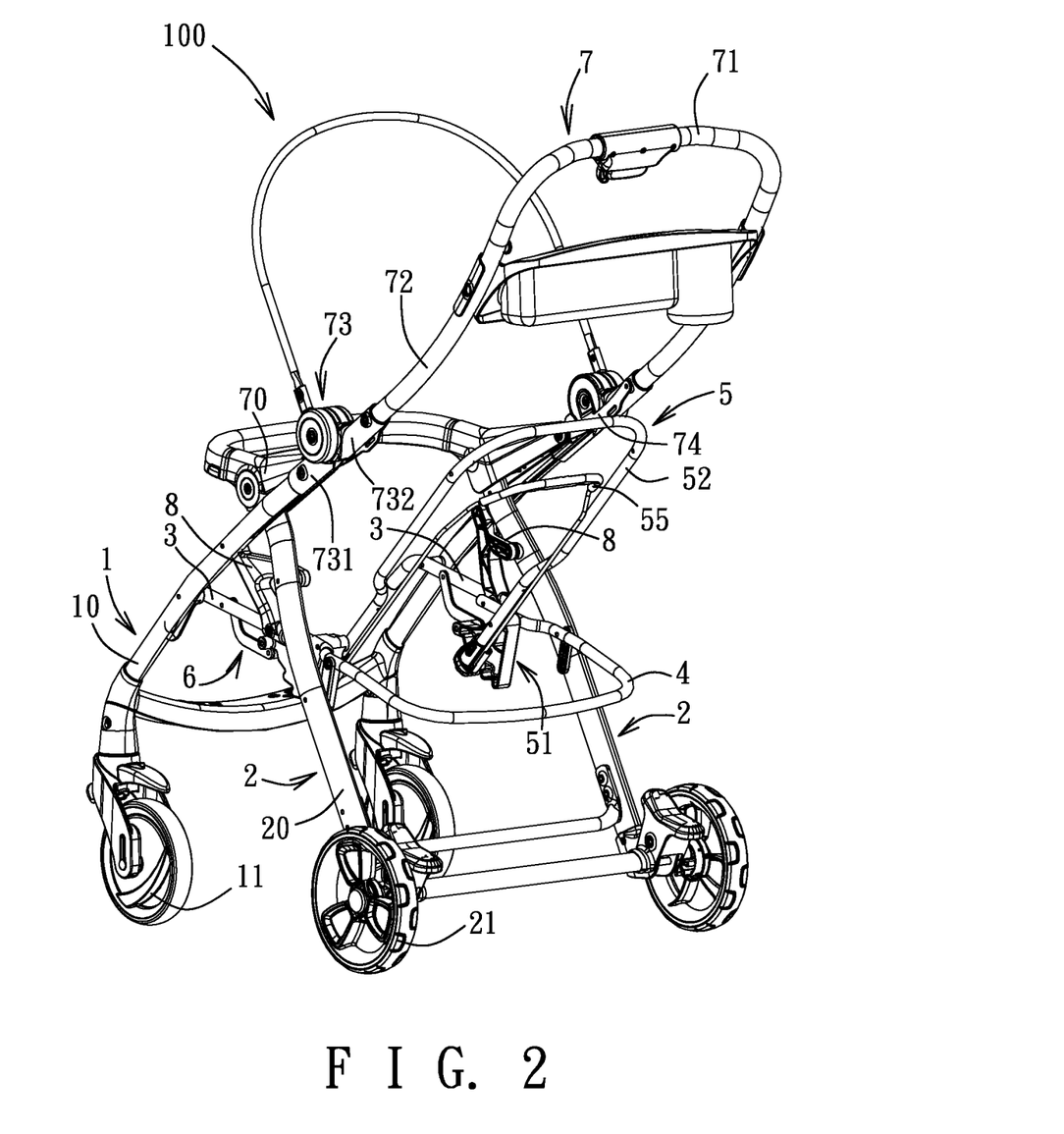
FIG. 2 is a rear perspective view of the preferred embodiment.

Referring to FIGS. 1 and 2, the preferred embodiment of a foldable stroller 100 according to this invention includes two front legs 1, two rear legs 2 forming an angle with the front legs 1, respectively, two seat-supporting tubes 3 connected respectively and pivotally to the front legs 1, a basket frame 4 connected to the two seat-supporting tubes 3, and a backrest frame 5 connected pivotally to the basket frame 4. Each of the front legs 1 includes a front wheel 11 disposed at a bottom end thereof. Each of the rear legs 3 includes a rear wheel 21 disposed at a bottom end thereof.

Figure 3:
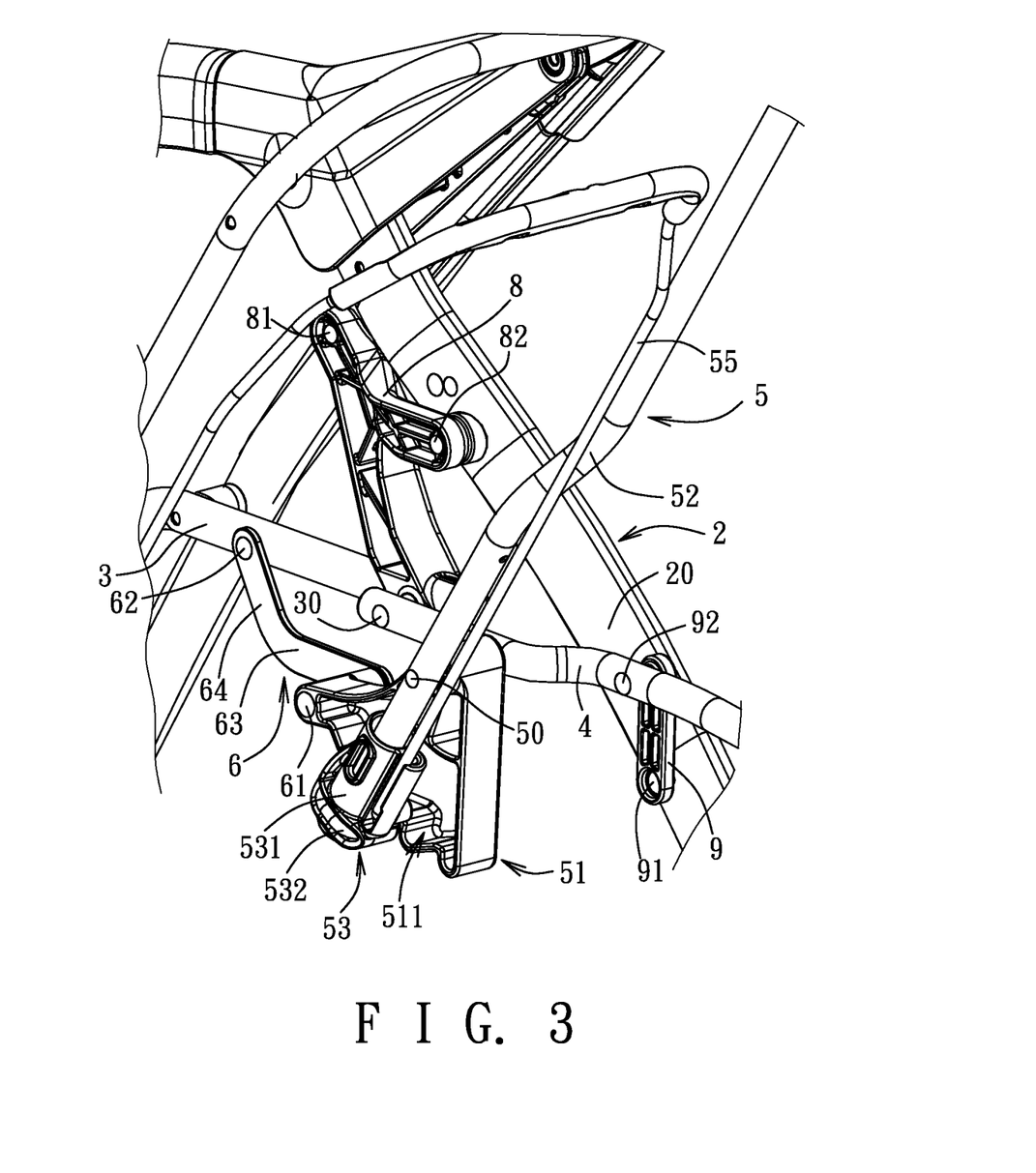
FIG. 3 is a fragmentary perspective view of the preferred embodiment, illustrating a backrest frame, a connecting rod, a connecting frame, and a connecting rod.

With further reference to FIG. 3, each of the seat-supporting tubes 3 has a rear end that is connected pivotally to a front end of the basket frame 4 at a first pivot point 30. The backrest frame 5 includes two pivoting members 51 disposed respectively two opposite sides of a bottom end thereof, and a backrest-supporting tube 52 connected to the two pivoting members 51. Each of the pivoting members 51 has a top end that is connected pivotally to the basket frame 4 and the backrest supporting tube 52 at a second pivot point 50. The foldable stroller 100 further includes two connecting rods 6. Each of the connecting rods 6 has a rear end connected pivotally to a front end of the corresponding pivoting member 51 at a third pivot point 61, and a front end connected pivotally to the corresponding seat-supporting tube 3 at a fourth pivot point 62. Due to the design of the first, second, third, and fourth pivot points 30, 50, 61, 62, by rotating the basket frame 4 and the seat-supporting tubes 3 relative to each other about the first pivot point 30, the pivoting members 51 and the connecting rods 6 are rotated relative to each other about the third pivot point 61 to thereby rotate the backrest-supporting tube 52 and the basket frame 4 toward the rear legs 2 in different (i.e., opposite) directions. As such, the backrest frame 5 can be folded automatically when folding the stroller, thereby resulting in convenience during folding of the stroller 100.

In this embodiment, each of the first, second, third, and fourth pivot points 30, 50, 61, 62 is defined by a pivot shaft. Alternatively, each of the first, second, third, and fourth pivot points 30, 50, 61, 62 may be of any other suitable pivotal connection structure.

The structure and operation of the foldable stroller 100 will be described hereinafter in more detail.

Figure 4:
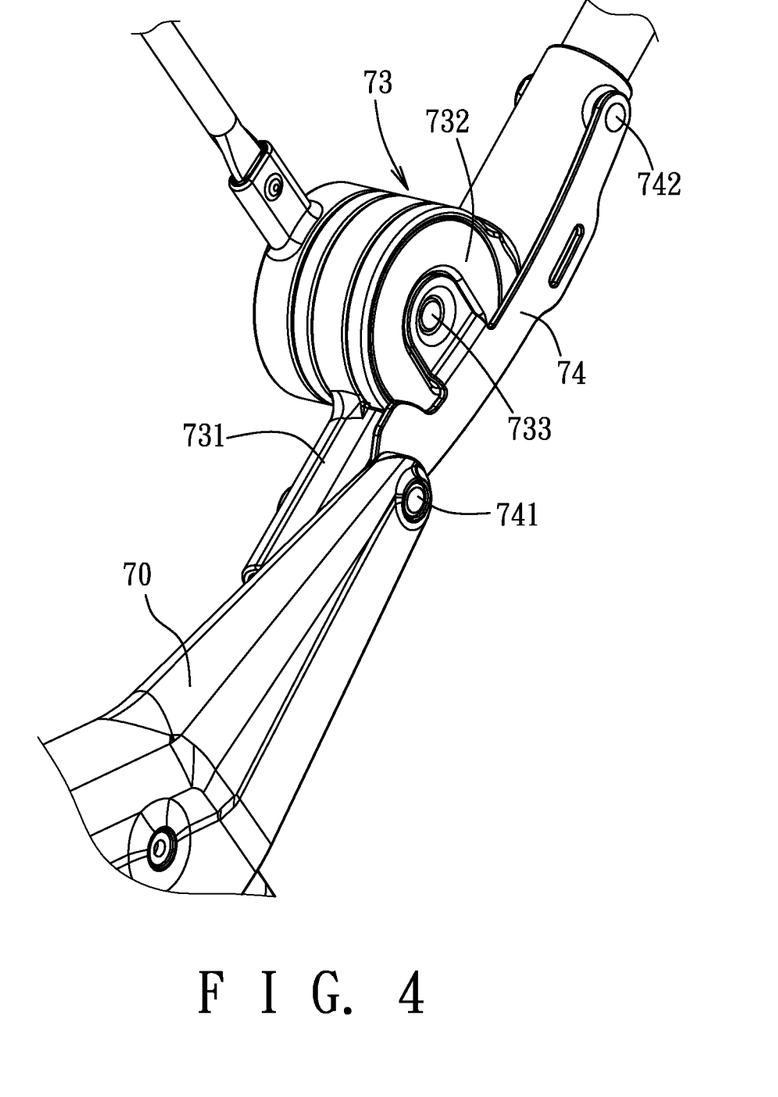
FIG. 4 is a fragmentary perspective view of the preferred embodiment, illustrating a connecting housing and a link rod.

With further reference to FIG. 4, each of the front legs 1 further includes a front tube 10 mounted with the front wheel 11 at a bottom end thereof. Each of the rear legs 2 further includes a rear leg 20 mounted with the rear wheel 21 at a bottom end thereof. The foldable stroller 100 further includes a handle frame 7. The handle frame 7 includes a grip tube 71, two extension tubes 72 extending respectively and downwardly from two opposite ends of the grip tube 71, and two connecting housings 73. Each of the connecting housings 73 includes a first sleeve portion 731 sleeved fixedly on the corresponding front tube 10, and a second sleeve portion 732 sleeved fixedly on a bottom end of the corresponding extension tube 72 and having a bottom end connected pivotally to a top end of the first sleeve portion 731 by a pivot pin 733. Due to the design of the connecting housings 73, the handle frame 7 is rotatable relative to the front legs 1 in a direction toward front sides of the front legs 1.

The rear tube 20 of each of the rear legs 2 has a top end that is provided with an armrest 70, which has an intermediate portion connected pivotally to the corresponding rear tube 20. Each of the connecting housings 73 is connected to the corresponding armrest 70 by a link rod 74, which has a bottom end connected pivotally to a rear end of the corresponding armrest 70 by a first pivot rod 741, an intermediate portion connected to the corresponding second sleeve portion 732 by the pivot pin 733, and a top end connected pivotally to a top end portion of the corresponding second sleeve portion 732 by a second pivot rod 742. During rotation of the handle frame 7 relative to the front legs 1, the link rods 74 are driven by the second sleeve portions 732 of the connecting housings 73 to rotate about the pivot pins 733. Hence, a rear end of the armrest 70 is pivoted upwardly to thereby move the rear legs 2 toward the front legs 1.

Figure 5:
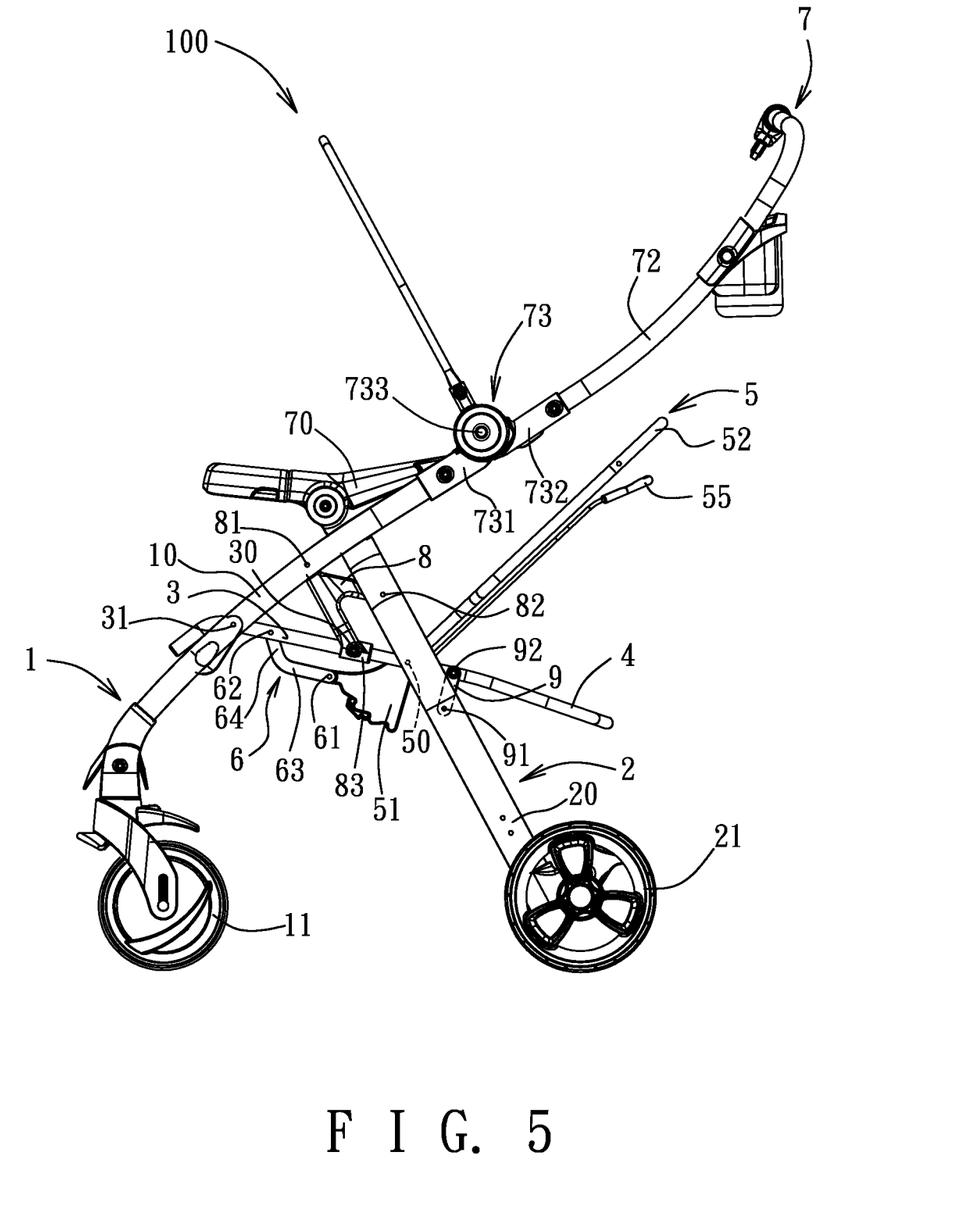
FIG. 5 is a side view of the preferred embodiment in an unfolded state.

With particular reference to FIGS. 1, 3, and 5, the foldable stroller 100 further includes two connecting frames 8. Each of the connecting frames 8 is connected pivotally between the corresponding front leg 1 and the corresponding rear leg 2, and is connected pivotally to the front tube 10 of the corresponding front leg 1 by a front pivot 81, and is connected pivotally to the rear tube 20 of the corresponding rear leg 2 by a rear pivot 82. Due to the design of the connecting frames 8, the rear legs 2 can be pivoted toward the front legs 1, respectively, and an angle can be formed between the front legs 1 and the rear legs 2 for maintaining the foldable stroller 100 in an unfolded state shown in FIG. 5.

A front end of each of the seat-supporting tubes 3 is connected pivotally to the front tube 10 of the corresponding front leg 1 by a front pivot shaft 31, which is spaced apart and disposed in front of the corresponding first pivot point 30. Each of the connecting frames 8 includes a sleeve member 83 disposed at a bottom end thereof and sleeved fixedly on a rear end of the corresponding seat-supporting tube 3. As such, the connecting frames 8 can provide an upward support to the seat-supporting tubes 3, and maintain a seat (not shown) mounted on the seat-supporting tubes 3 at an inclined position, thereby allowing a baby (not shown) to be seated stably thereon.

In this embodiment, the pivot shaft defining the first pivot point 30 extends through the corresponding sleeve member 83 and the corresponding seat-supporting tube 3, so that The corresponding sleeve member 83 is sleeved fixedly on the corresponding seat-supporting tube 3, and is connected pivotally to the basket frame 4. As such, during the rear legs 2 are pivoted toward the front legs 1, each of the connecting frames 8 and the seat-supporting tubes 3 is activated to pivot the basket frame 4 about the first pivot point 30 in a direction toward the corresponding front leg 1.

The basket frame 4 has left and right ends, each of which is connected to the rear tube 20 of the corresponding rear leg 2 by a connecting rod 9 that is disposed behind the first pivot point 30. The connecting rod 9 has a bottom end connected pivotally to the corresponding rear tube 20 by a first pivot shaft 91 (see FIG. 3), and a top end connected pivotally to an intermediate portion of the basket frame 4 by a second pivot shaft 92 (see FIG. 3). Since the basket frame 4 is connected pivotally to the sleeve member 83 of each of the connecting frames 8 at the first pivot point 30 and to the corresponding connecting rod 9 at an intermediate portion thereof, a rear end of the basket frame 4 can be prevented from declining so as to be maintained stably at an inclined position shown in FIG. 5 when the foldable stroller 100 is in the unfolded state.

Each of the connecting rods 6 has a generally horizontal first rod section 63 and an inclined second rod section 64 that has a lower end connected to a front end of the first rod section 63 and that forms an angle with the first rod section 63. In this embodiment, the angle formed between the first and second rod sections 63, 64 of each of the connecting rods 6 is an obtuse angle. A rear end of the first rod section 63 of each of the connecting rods 6 is connected pivotally to a front end of the corresponding pivoting member 51 at the third pivot point 61. A front end of the second rod section 64 of each of the connecting rods 6 is connected pivotally to the corresponding seat-supporting tube 3 at the fourth pivot point 62. The third pivot point 61 is spaced apart from and disposed under the first pivot point 30. Due to the design of the second, third, and fourth pivot points 50, 61, 62, the backrest frame 5 and the connecting rods 6 can be maintained at the positions shown in FIG. 5 when the foldable stroller 100 us in the unfolded state.

Figure 6:
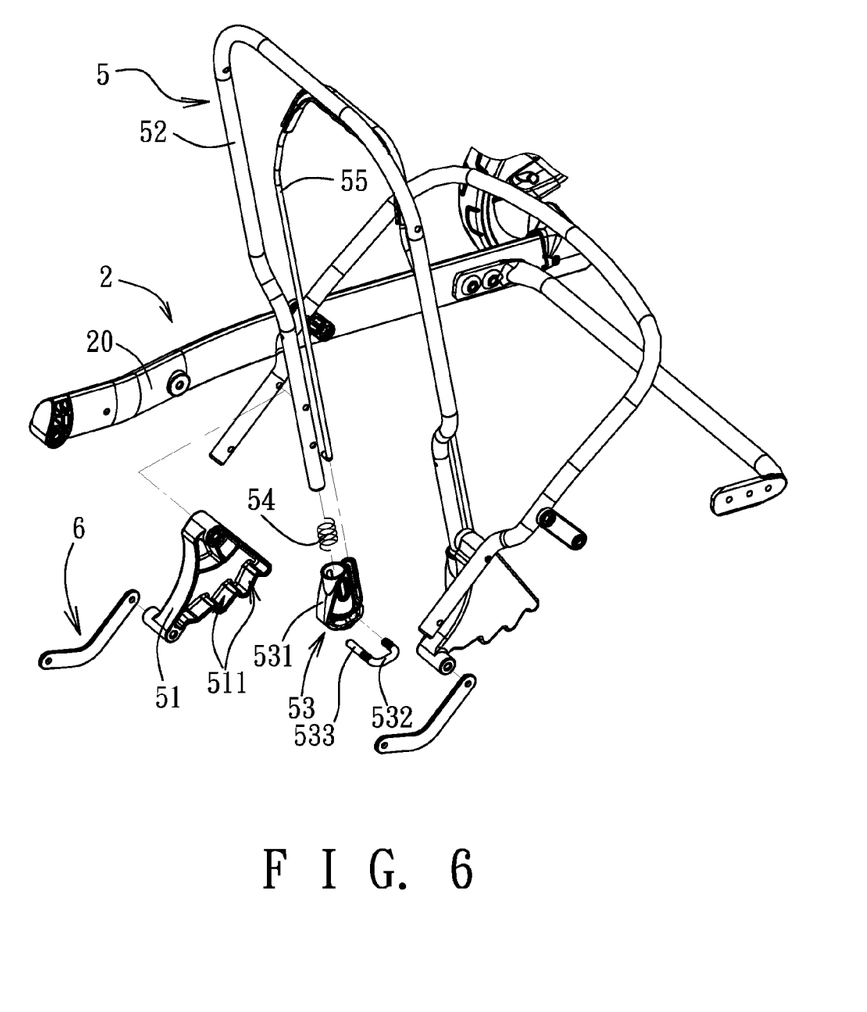
FIG. 6 is a fragmentary, partly exploded perspective view of the preferred embodiment.

With particular reference to FIGS. 3 and 6, at least one of the two pivoting members 51 is formed with a plurality of positioning grooves 511. The backrest frame 5 further includes an engaging member 53 sleeved movably on a bottom end of the backrest-supporting tube 52, and a biasing spring 54. The engaging member 53 is engaged within a selected one of the positioning grooves 511. The biasing spring 54 is disposed for biasing the engaging member 53 into the selected one of the positioning grooves 511, so as to position the engaging member 53 in the selected positioning groove 511, thereby maintaining the backrest-supporting tube 52 at a corresponding inclined position. In this embodiment, The engaging member 53 includes a sleeve 531 sleeved movably on the bottom end of the backrest-supporting tube 52, and an engaging rod 532 disposed fixedly on the sleeve 531. The biasing spring 54 is a compression spring that is disposed within the sleeve 531 for biasing the sleeve 531. The engaging rod 532 has a horizontal rod section 533 engageable with the selected one of the positioning grooves 511. Alternatively, the engaging rod 532 may be formed integrally on the sleeve 531.

The backrest frame 5 further includes an actuator 55 connected to the sleeve 531 of the engaging member 53. An user may pull the actuator 55 upwardly to move the engaging member 53 upwardly on the backrest-supporting tube 52. Hence, the horizontal rod section 533 of the engaging rod 532 is removed from the selected positioning groove 511, and the sleeve 531 compresses the compression spring 54 to remove the engaging member 53 from the corresponding pivoting member 51. At this time, the user can rotate the backrest-supporting tube 52 about the second pivot point 50 to adjust the angular position of the backrest-supporting tube 52. Upon completion of position adjustment of the backrest-supporting tube 52, the actuator 55 is released to allow the engaging member 53 to be biased by the biasing spring 54 into another positioning groove 511, thereby maintaining the backrest-supporting tube 52 at another angular position.

In this embodiment, both of the pivoting members 51 are formed with the positioning grooves 511. The positioning grooves 511 in one of the pivoting members 51 are aligned respectively with the other one of the pivoting members 51. Correspondingly, in this embodiment, the backrest-supporting frame 5 includes two engaging members 53 and two biasing springs 54. The actuator 55 is configured as an inverted U-shaped cable, and has two ends secured respectively within the sleeves 531 of the two engaging members 53. As such, the actuator 53 can be operated to remove the two engaging members 53 from the two pivoting members 51, thereby allowing for angle adjustment of the backrest-supporting tube 52.

With particular reference to FIGS. 4, 5, 7, and 8, when it is desired to change the foldable stroller 100 from the unfolded state into the folded state, the foldable stroller 100 is first unlocked. Since the unlocking operation is not pertinent to this invention, further description thereof will be omitted herein. Next, the handle frame 7 is pushed forwardly in a first direction (I) and then pressed downwardly to rotate the second sleeve portions 732 of the handle frame 7 relative to the first sleeve portions 731 about the pivot pins 733 toward the front legs 1. Since the link rods 74 are connected respectively and pivotally to rear ends of the armrests 70 by the first pivot rods 741, when the second sleeve portions 732 are rotated relative to the first sleeve portions 731, the link rods 74 rotate about the pivot pins 733 to pivot the armrests 70 downwardly about the first pivot rods 741 to thereby move the rear ends of the armrests 70 upwardly. At the same time, downward pivoting movement of the armrests 70 results in pivoting movement of the rear legs 2 relative to the armrests 70 toward the front legs 1 in a second direction (II) (see FIG. 7).

Figure 7:
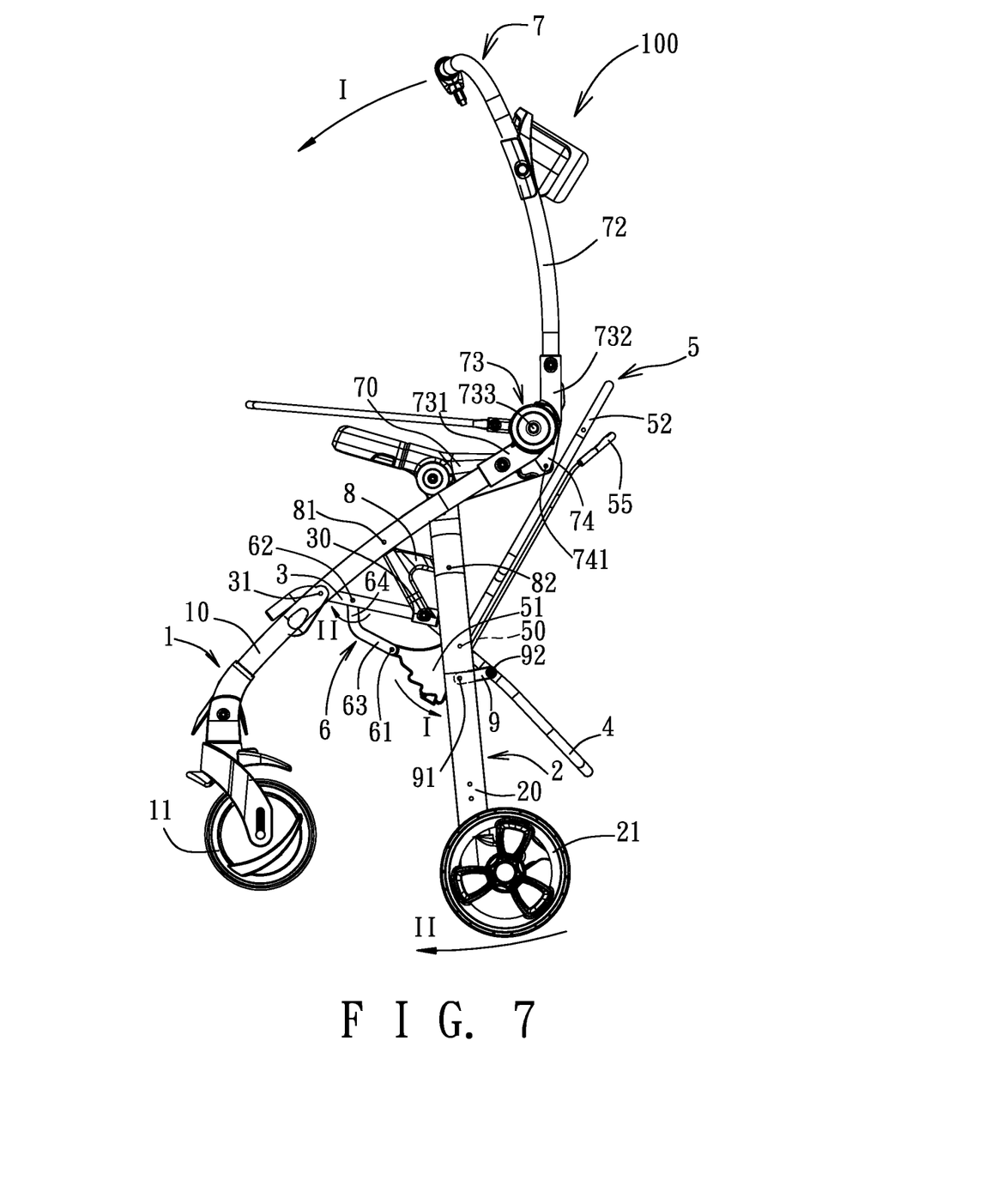
FIG. 7 is a side view of the preferred embodiment in a semi-folded state, illustrating how the stroller is folded.
Figure 8:
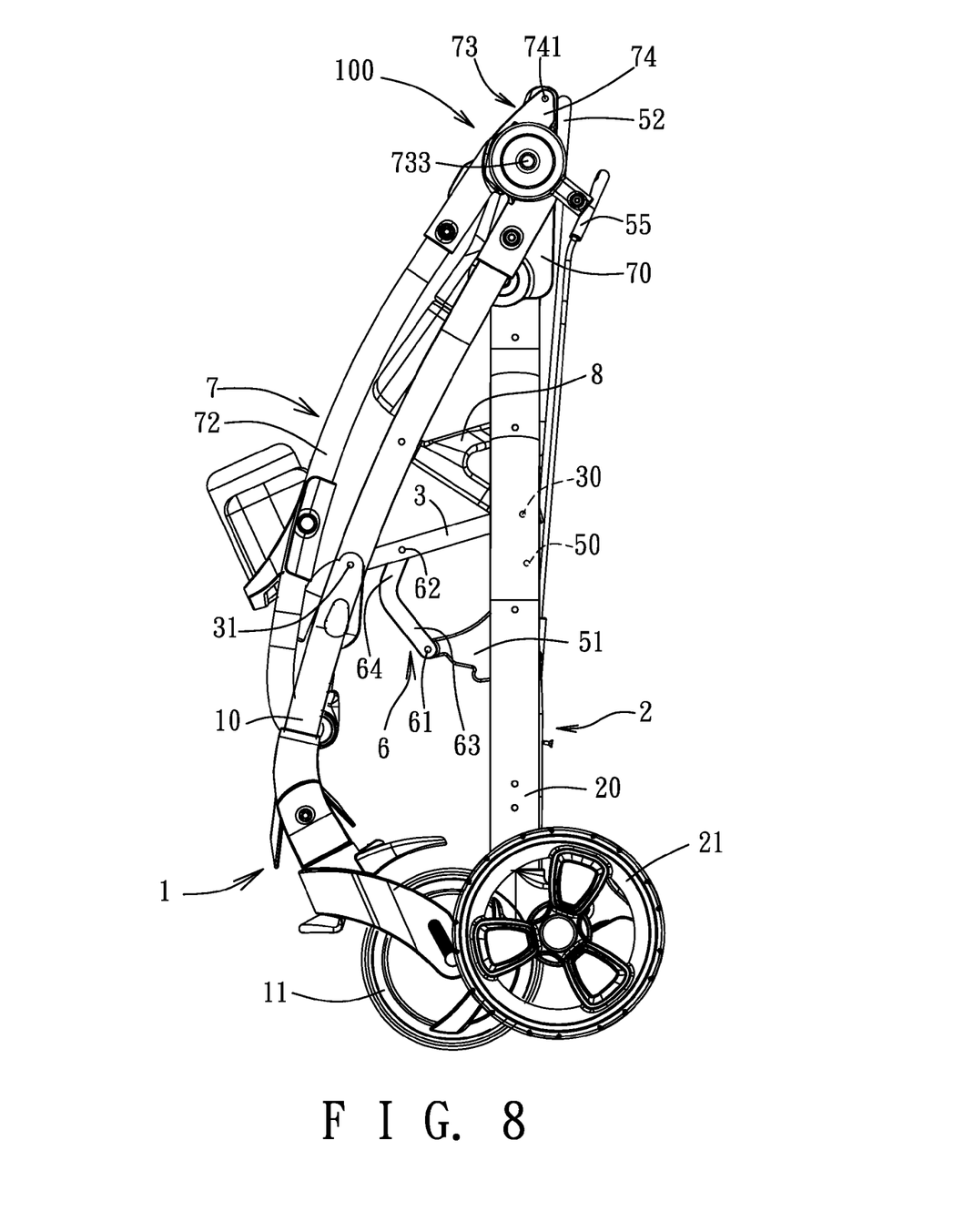
FIG. 8 is a side view of the preferred embodiment in a folded state.

With particular reference to FIGS. 7 and 8, during forward pivoting movement of the rear legs 2 toward the front legs 1, the rear legs 2 activate the connecting rods 9 to pull the basket frame 4 downwardly to rotate the basket frame 4 relative to the connecting frames 8 and the seat-supporting tubes 3 about the first pivot point 30 toward rear sides of the rear legs 2 in the second direction (II). When the basket frame 4 is rotated in the second direction (II), the pivoting members 51 and the backrest-supporting tube 52 are pushed downwardly by the pivot shafts defining the second pivot point 50, and the second pivot point 50 is moved toward the fourth pivot point 62, so that the pivoting members 51 are pushed by the connecting rods 6 to rotate about the second pivot point 50 to thereby rotate the backrest-supporting tube 52 about the second pivot point 50 in the first direction (I), thus pivoting the backrest-supporting tube 52 toward the rear sides of the rear legs 2.

When the grip tube 71 and the extension tubes 72 are folded on front sides of the front legs 1, and when the rear legs 2 are folded on the rear sides of the front legs 1, the foldable stroller 100 is in a folded state, as shown in FIG. 8. In this state, the second pivot point 50 is disposed under the first pivot point 30, and the basket frame 4 and the backrest-supporting tube 52 are folded on the rear legs 2. As a result, the total volume of the foldable stroller 100 is reduced largely after it is folded.

In view of the above, by rotating the basket frame 4 and the seat-supporting tubes 3 about the first pivot point 30, the pivoting members 51 and the connecting rods 6 rotate about the third pivot point 61 to pivot the backrest-supporting tube 52 and the basket frame 4 toward the rear sides of the rear legs 2. Such a structure is relatively simple. Furthermore, the backrest frame 5 can be folded automatically when folding the foldable stroller 100. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. A foldable stroller comprising two front legs, two rear legs forming an angle with said front legs, respectively, two seat-supporting tubes connected respectively and pivotally to said front legs, a basket frame connected pivotally between said rear legs, and a backrest frame, each of said front legs including a front wheel disposed on a lower end thereof, each of said rear legs including a rear wheel disposed on a lower end thereof, wherein:

each of said seat-supporting tubes has a rear end connected pivotally to a front end of said basket frame at a first pivot point, said backrest frame including two pivoting members disposed respectively at two opposite sides of a bottom end thereof, and a backrest-supporting tube connected to said pivoting members, each of said pivoting members having a top end connected pivotally to said basket frame at a second pivot point, said foldable stroller further comprising two connecting rods, each of said connecting rods having a rear end connected pivotally to a front end of a respective one of said pivoting members at a third pivot point, and a front end connected pivotally to a respective one of said seat-supporting tubes at a fourth pivot point, rotation of said basket frame and said seat-supporting tubes relative to each other about said first pivot point resulting in rotation of said pivoting members relative to said connecting rods about said third pivot point to thereby rotate said backrest-supporting tube and said basket frame toward said rear legs in different directions.

2. The foldable stroller as claimed in claim 1, further comprising two connecting frames, each of which is connected pivotally between a respective one of said front legs and a respective one of said rear legs, so as to maintain said foldable stroller in an unfolded state, each of said connecting frames including a sleeve member disposed at a bottom end thereof and connected fixedly to a rear end of a corresponding one of said seat-supporting tubes.

3. The foldable stroller as claimed in claim 2, wherein, when said foldable stroller is in an unfolded state, said second pivot point is spaced apart from and located between said first pivot point and a pivot connection point between said basket frame and each of said rear legs, said fourth pivot point is spaced apart from and located between said first point and a pivot connection point between each of said seat-supporting tubes and a corresponding one of said front legs, and said third pivot point is spaced apart from and located under said first pivot point.

4. The foldable stroller as claimed in claim 3, wherein, when said foldable stroller is in a folded state, said second pivot point is spaced apart from and located under said first pivot point, and said basket frame and said backrest-supporting tube are folded on said rear legs.

5. The foldable stroller as claimed in claim 4, wherein each of said connecting rods has a first rod section and a second rod section that has an end connected to an end of said first rod section and that forms an angle with said first rod section, said first rod section of each of said connecting rods having a rear end that is connected pivotally to a front end of a corresponding one of said pivoting members at said third pivot point, said second rod portion of each of said connecting rods having a front end that is connected pivotally to a corresponding one of said seat-supporting tubes at said fourth pivot point.

6. The foldable stroller as claimed in claim 5, wherein each of said first, second, third, and fourth pivot points is defined by a pivot shaft.

7. The foldable stroller as claimed in claim 6, wherein said sleeve member of each of said connecting frames is sleeved on the corresponding one of said seat-supporting tubes, and said pivot shaft defining said first pivot point extends through the corresponding one of said seat-supporting tubes, said basket frame, and said sleeve member of a corresponding one of said connecting frames, so that the sleeve member of the corresponding one of said connecting frames is connected fixedly to the corresponding one of said seat-supporting tubes, and is connected pivotally to said basket frame.

8. The foldable stroller as claimed in claim 6, wherein at least one of said pivoting members is formed with a plurality of positioning grooves, said backrest-supporting tube being connected pivotally to each of said pivoting members at said second pivot point, said backrest frame further including an engaging member sleeved movably on a bottom end of said backrest-supporting rod, an actuator connected to said engaging member, and a biasing spring, said engaging member being engaged within a selected one of said positioning grooves to maintain said backrest-supporting rod at a corresponding angular position, said actuator being operable to remove said engaging member from the selected one of said positioning grooves, said biasing spring being disposed for biasing said engaging member into the selected one of said positioning grooves.

* * * * *